US011158022B2

(12) United States Patent
Lee et al.

(10) Patent No.: US 11,158,022 B2
(45) Date of Patent: Oct. 26, 2021

(54) ELECTRONICALLY OPERATED LOCKBOX MAILBOX ASSEMBLY

(71) Applicants: Christopher Sangmyung Lee, Renton, WA (US); Brett Richard Reznichek, Escondido, CA (US)

(72) Inventors: Christopher Sangmyung Lee, Renton, WA (US); Brett Richard Reznichek, Escondido, CA (US)

( * ) Notice: Subject to any disclaimer, the term of this patent is extended or adjusted under 35 U.S.C. 154(b) by 489 days.

(21) Appl. No.: 16/186,522

(22) Filed: Nov. 10, 2018

(65) Prior Publication Data
US 2019/0147559 A1 May 16, 2019

Related U.S. Application Data

(60) Provisional application No. 62/707,609, filed on Nov. 10, 2017.

(51) Int. Cl.
G06Q 50/32 (2012.01)
G06Q 10/08 (2012.01)
(Continued)

(52) U.S. Cl.
CPC ......... *G06Q 50/32* (2013.01); *G06Q 10/0832* (2013.01); *G07C 9/00309* (2013.01);
(Continued)

(58) Field of Classification Search
CPC . G06Q 50/32; G06Q 10/0832; G07C 9/00309
(Continued)

(56) References Cited

U.S. PATENT DOCUMENTS 7,234,609 B2 * 6/2007 DeLazzer ............... G07F 9/002
221/10
2013/0307670 A1 * 11/2013 Ramaci ............... H04L 63/0861
340/5.82
(Continued)

FOREIGN PATENT DOCUMENTS

WO    WO-03040979 A1 *  5/2003  ............. G06Q 10/08

OTHER PUBLICATIONS

Homecoin. "$125 Lockbox Rental". Published on Wayback Machine on Feb. 15, 2017. https://web.archive.org/web/20170215055943/ https://homecoin.com/lockbox-rental (Year: 2017).*
(Continued)

*Primary Examiner* — George Chen
*Assistant Examiner* — Lisa Ma
(74) *Attorney, Agent, or Firm* — Kirk A. Buhler; Buhler & Associates Patenting

(57) ABSTRACT

Improvements in an electronically operated lockbox mailbox assembly is disclosed. The assembly provides a customizable lockbox assembly with a smart lock. The enclosure can be configured with heating, cooling and humidity functions so the internal contents remains at an optimal temperature for storage until the unit is unlocked. The assembly can be linked with other home security devices. The smart lock operated with an application for tracking, opening and security of the assembly. The assembly may take the form of a box, locker, or similar shape that can be either free-standing or "hard installed" as part of a new commercial or residential build or retrofitted to an existing commercial or residential build that is powered via hardwire, plug or battery.

19 Claims, 6 Drawing Sheets

(51) Int. Cl.
    *G07C 9/00*         (2020.01)
    *G06K 7/14*         (2006.01)
    *G06K 7/10*         (2006.01)

(52) U.S. Cl.
    CPC ....... *G06K 7/10297* (2013.01); *G06K 7/1413* (2013.01); *G07C 2009/00325* (2013.01)

(58) Field of Classification Search
    USPC .......................................................... 705/332
    See application file for complete search history.

(56) References Cited

U.S. PATENT DOCUMENTS

| | | | |
|---|---|---|---|
| 2015/0102903 A1 | 4/2015 | Wilkinson | |
| 2016/0275450 A1 | 9/2016 | Chang | |
| 2016/0300187 A1* | 10/2016 | Kashi | G06Q 10/0836 |
| 2017/0018133 A1 | 1/2017 | Wilkinson | |
| 2017/0286905 A1* | 10/2017 | Richardson | G06Q 10/0832 |
| 2018/0165902 A1* | 6/2018 | Wilkinson | F25D 19/00 |
| 2019/0350398 A1* | 11/2019 | Raphael | A47G 29/141 |

OTHER PUBLICATIONS

SuraEKey. "DisplayKEY brochure". Published on Wayback Machine on Jun. 17, 2017. https://web.archive.org/web/20170617221137/http://www.supraekey.com/Documents/DisplayKEY_brochure.pdf (Year: 2017).*

* cited by examiner

ELECTRONICALLY OPERATED LOCKBOX MAILBOX ASSEMBLY

CROSS REFERENCE TO RELATED APPLICATION

This application claims the benefit of Provisional Application Ser. No. 62/707,609 filed Nov. 10, 2017 the entire contents of which is hereby expressly incorporated by reference herein.

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC

Not Applicable

BACKGROUND OF THE INVENTION

Field of the Invention

This invention relates to improvements in a lockbox/mailbox. More particularly, the present electronically operated lockbox mailbox assembly is customizable security enclosure that includes an electronically operated locking and unlocking mechanisms, and controls (cooling, heating, humidity, etc.) mechanisms, and alert/camera/alarm mechanisms.

Description of Related Art Including Information Disclosed Under 37 CFR 1.97 and 1.98

Mailboxes come in a wide range of shapes and designs. Most mailboxes do not lock, and when they do, it is generally with a manual lock. Some mailboxes are subsequently retrofitted to have a wireless lock, but these are generally not as secure as an OEM lock and generally not suitable for delivery of packages, particularly valuable packages or those which require a signature, or those in which theft of the package will cause further potential damages beyond the illegal act of theft itself.

The prior art teaches mailboxes that may be wirelessly connected with a portable electronic device. However, the prior art does not teach mailboxes that include in form and function all of the necessary elements for delivery of grocery/meal delivery services (e.g. Blue Apron, Amazon Fresh, Uber Eats or similar) via conditions controlled (cooling, heating, humidity, etc.) box, secured delivery of valuable shipments including, but not limited to, consumer goods, prescription medications and controlled substances (e.g. marijuana, alcohol, etc.) and also their secured returns and exchanges.

A number of patents and or publications have been made to address these issues. Exemplary examples of patents and or publication that try to address this/these problem(s) are identified and discussed below.

U.S. Publication Number 2015/0102903 was published on Apr. 15, 2015 for Bruce W. Wilkinson and is titled Secure Delivery Receptacle. This publication discloses a secure-delivery receptacle includes a delivered-package vault having a selectively-lockable access portal controlled, at least in part, by a control circuit that also operably couples to a radio-frequency identification (RFID)-tag reader. The RFID-tag reader serves, by one approach, to read RFID tags in the immediate vicinity of the delivered-package vault. The control circuit can, for example, verify a delivery-vector RFID tag (such as an RFID tag uniquely associated with a given delivery person) and responsively unlock the selectively-lockable access portal.

U.S. Publication Number 2016/0275450 was published on Sep. 22, 2016 for James Chan-Chia Chang and is titled Method of Providing Access to a Secure Receptacle to Complete a Package Delivery. This publication discloses a method of providing access to a secure receptacle to complete a package delivery is implemented through a storage compartment, a central server, a recipient computing device, and a courier computing device. The overall process includes a generation of a one-time key code by the central server upon completion of a purchase order, wherein the recipient computing device completes and transmits the purchase order. The one-time key code is then provided to the storage compartment and the courier computing device. The one-time key code allows a courier that assigned to the courier computing device to unlock the storage compartment and place a purchased product in the storage compartment.

U.S. Publication Number 2017/0018133 was published on Jan. 19, 2017 for Bruce W. Wilkinson and is titled Apparatus and Method to Determine Whether to Unlock a Delivered-Package Vault. This publication discloses a delivered-package vault has a selectively-lockable access portal that is configured to contain at least one package, which package has at least one recipient-specific requirement associated therewith. The delivered-package vault also includes a two-way communications interface configured to communicate with a remote source having that at least one recipient-specific requirement and further includes a control circuit that operably couples to the two-way communications interface and the selectively-lockable access portal.

These publications fail to provide the solution in this document. What is needed is an electronically operated lockbox mailbox assembly. The present invention fulfills these needs and provides further advantages as described in this document.

BRIEF SUMMARY OF THE INVENTION

It is an object of the electronically operated lockbox mailbox assembly to provide a customizable lockbox assembly that includes a secured housing enclosing electronic components of the locking/unlocking mechanism that is secured with a locking apparatus that will be controlled via Wi-Fi, Bluetooth, cellular signal, or other universally recognized standard and be compatible with major logistical ecosystems (e.g. Samsung ARTIK+SmartThings, Amazon Alexa and Echo, Ring, Nest, IFTTT, proprietary standalone App, etc.) via API or other electronic means.

It is another object of the electronically operated lockbox mailbox assembly to provide a lockbox/mailbox assembly which will provide electronically operated locking and unlocking mechanisms, conditions control (cooling, heating, humidity, etc.) mechanisms, and alert/camera/alarm mechanisms designed to work with current and future compatible standards (e.g. Samsung ARTIK+SmartThings, Amazon Alexa and Echo, Ring, Nest, IFTTT, proprietary standalone App, etc.) via API or other electronic/digital means or keypad.

It is another object of the electronically operated lockbox mailbox assembly to provide a lockbox/mailbox assembly which can be enhanced via a decorative cover, adhesive or decoration that may be adapted to fit over an outer surface of the housing via unsecured placement over existing assembly, secured to the assembly, or by direct application to the assembly. The decorative cover(s) enable the quick and easy customization of the lockbox assembly.

It is another object of the electronically operated lockbox mailbox assembly to provide a lockbox/mailbox assembly, which will provide the necessary elements for delivery of grocery/meal delivery services (e.g. Blue Apron, Amazon Fresh, Uber Eats or similar) via conditions controlled (cooling, heating, humidity, etc.) box, secured delivery of valuable shipments including, but not limited to, consumer goods, prescription medications and controlled substances (e.g. marijuana, alcohol, etc.) and also their secured returns and exchanges.

It is another object of the electronically operated lockbox mailbox assembly to provide a lockbox/mailbox assembly where the boxes may be modular or individual in design with various properties such as cooling or warming via thermoelectric properties to be "green" (environmentally friendly).

It is another object of the electronically operated lockbox mailbox assembly to provide a lockbox/mailbox assembly that will include a camera, motion sensor, and/or other recognition or communication device controllable via API or other electronic/digital means in conjunction with an audible, visual and/or communication based alarm (currently text or phone call) controllable via said API or other electronic/digital means as a theft deterrent and/or parental/signature control for release of the shipment.

It is another object of the electronically operated lockbox mailbox assembly to provide a lockbox/mailbox assembly designed and consisting of a virtually indestructible injection molded box, shell or "pod" made of plastic, metal and other rigid and flexible materials to deter theft via prying into or breaking the device.

It is another object of the electronically operated lockbox mailbox assembly to provide a lockbox/mailbox assembly that will be "trackable" via API (e.g. Find my iPhone) to deter theft via location-based tracking of items secured within the unit.

It is another object of the electronically operated lockbox mailbox assembly to provide a lockbox/mailbox assembly that will be have a rigid or flexible loop or link (e.g. Real Estate key lockbox, bicycle chain, etc.) that will allow the assembly to be secured to a doorknob, fence, post, portion of building or house, or any fixed object or group of objects that would generally be considered to be immovable.

It is another object of the electronically operated lockbox mailbox assembly to provide a lockbox/mailbox assembly that may take the above form or that of a box, locker, or similar shape that can be either free-standing or "hard installed" as part of a new commercial or residential build or retrofitted to an existing commercial or residential build that is powered via hardwire, plug or battery.

It is still another object of the electronically operated lockbox mailbox assembly to provide a lockbox/mailbox assembly that may resemble furniture in the form of a bench, plant stand, etc. or other object commonly associated with home goods that would also include the characteristics and functions above.

Various objects, features, aspects, and advantages of the present invention will become more apparent from the following detailed description of preferred embodiments of the invention, along with the accompanying drawings in which like numerals represent like components.

BRIEF DESCRIPTION OF THE SEVERAL VIEWS OF THE DRAWING(S)

DETAILED DESCRIPTION OF THE INVENTION

Figure 1:
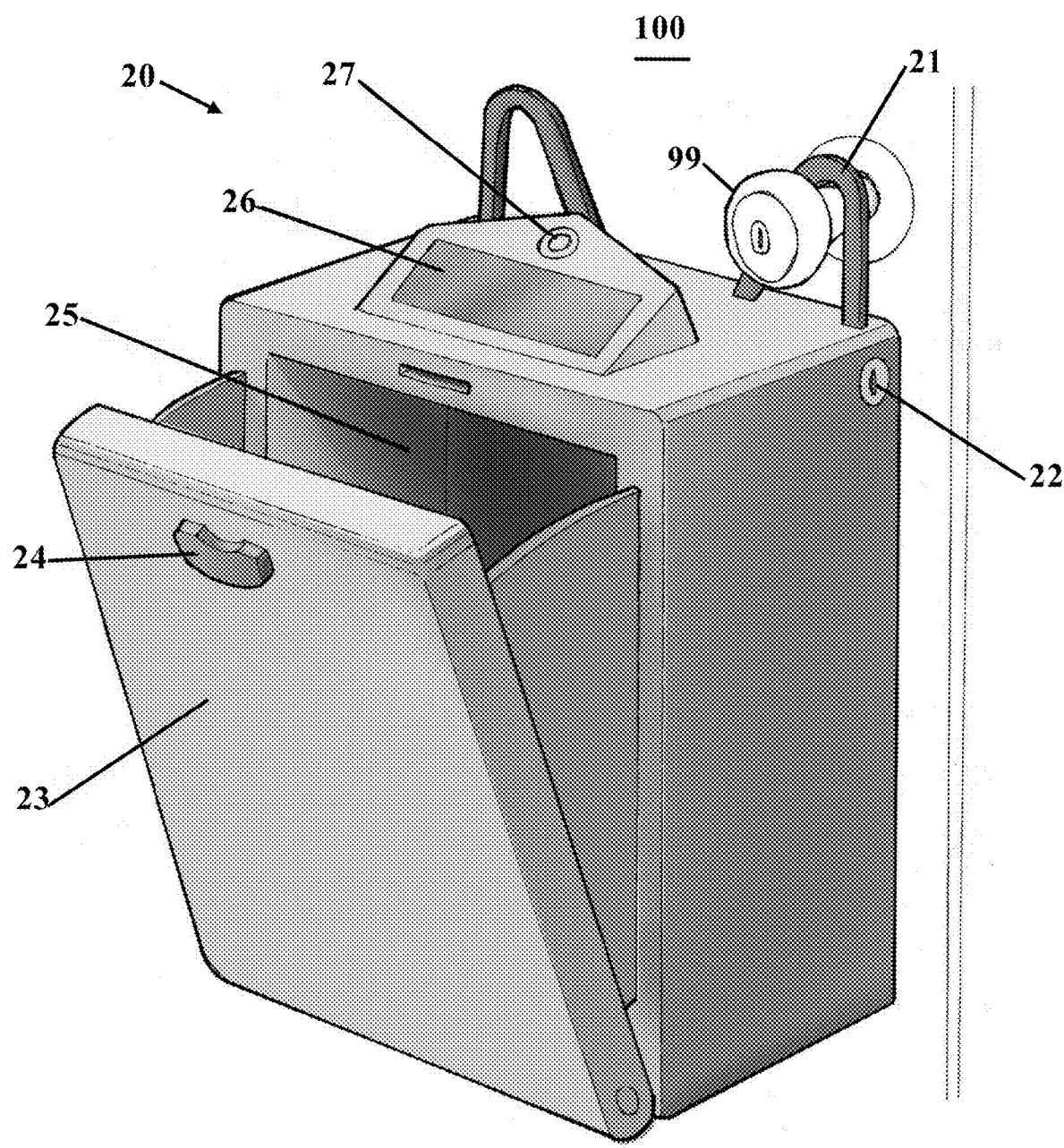
FIG. 1 shows an electronically operated lockbox mailbox assembly.

It will be readily understood that the components of the present invention, as generally described and illustrated in the drawings herein, could be arranged and designed in a wide variety of different configurations. Thus, the following more detailed description of the embodiments of the system and method of the present invention, as represented in the drawings, is not intended to limit the scope of the invention, but is merely representative of various embodiments of the invention. The illustrated embodiments of the invention will be best understood by reference to the drawings, wherein like parts are designated by like numerals throughout.

| Item Numbers and Description | |
|---|---|
| 20 | electronically operated lockbox mailbox assembly |
| 21 | U Bolt |
| 22 | lock |
| 23 | door |
| 24 | latch |
| 25 | storage area |
| 26 | display |
| 27 | camera |
| 28 | wall mount |
| 60 | lease lock-pod |
| 61 | lock-pod fulfilled |
| 62 | shipment tracking |
| 63 | lock-pod delivery |
| 64 | customer notified |
| 65 | E-signature verified |
| 66 | lock-pod registered with application |
| 70 | controller |
| 71 | WiFi Transmitter |
| 72 | antenna |
| 73 | touch screen |
| 74 | camera |
| 75 | speaker |
| 76 | microphone |
| 77 | GPS |
| 78 | plug |
| 79 | transformer |
| 80 | USB charger |
| 81 | battery |
| 82 | display |
| 83 | heat/cool |

-continued

| Item Numbers and Description | |
| --- | --- |
| 84 | light |
| 85 | sensor |
| 86 | lock control |
| 90 | signal |
| 91 | antenna |
| 92 | WiFi receiver |
| 93 | App interface |
| 99 | door knob |
| 100 | door |
| 110 | secure and sync Lock-Pod |
| 111 | shop online or local |
| 112 | setup shipping |
| 113 | notification sent to Lock-Pod |
| 114 | wait for delivery |
| 115 | package delivered, barcode scan/scheduled |

FIG. 1 shows an electronically operated lockbox mailbox assembly 20 installed on a door 100. In this embodiment the assembly 20 is shown secured with a U-bolt 21 or another securing member around a doorknob 99. This embodiment shows two U-bolt 21 features that allows the assembly 20 to be hung in a level orientation. The assembly 20 has a side lock 22 for securing the U-bolt 21 on a doorknob 99 or another stable house or building feature. The assembly 20 has a door 23 that encloses the storage area 25. A latch 24 is operable to open the door 23 when access is authorized. In this embodiment a screen 26 provides instructions and can display visual feedback to a user or delivery person. The screen 26 can be a touch screen. A camera or scanner 27 can record the delivery and can scan barcodes or other identifying information. It is also contemplated that the camera 27 can include a retina scanner or other ID/authorization mechanism.

Figure 2:
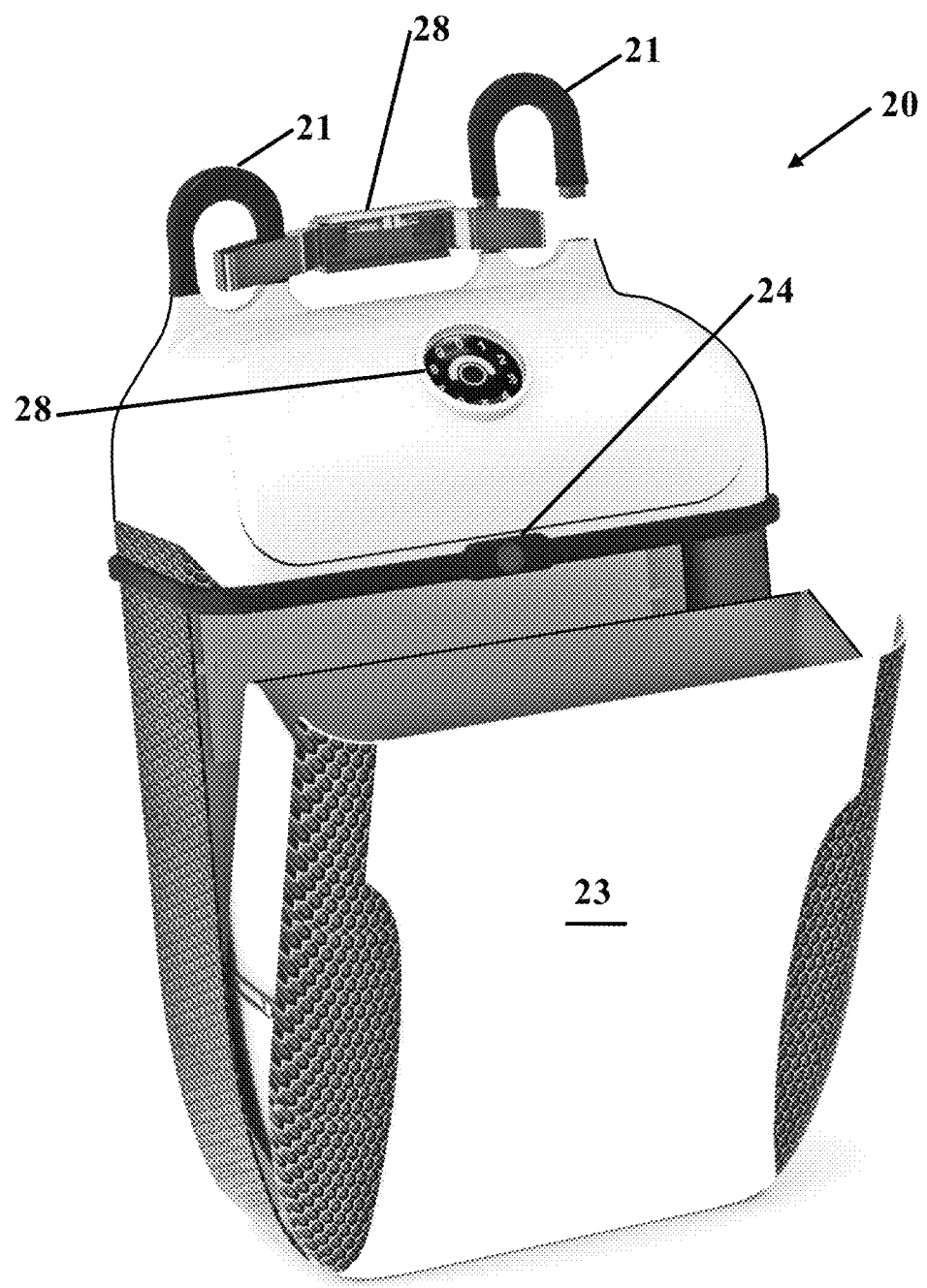
FIG. 2 shows a second embodiment of the electronically operated lockbox mailbox assembly.

FIG. 2 shows a second embodiment of the electronically operated lockbox mailbox assembly 20. In this embodiment a wall mount is shown secured between the two U-bolts 21. The wall mount 28 is secured to a wall, door or other structure. The wall mount is essentially permanently mounted and provides openings for one or both of the U-bolts.

The assembly can have a decorative cover, adhesive or decoration may be adapted to fit over an outer surface of the housing via unsecured placement over existing assembly, secured to the assembly, or by direct application. The decorative cover(s) enables the quick and easy customization of the lockbox assembly.

Figure 3:
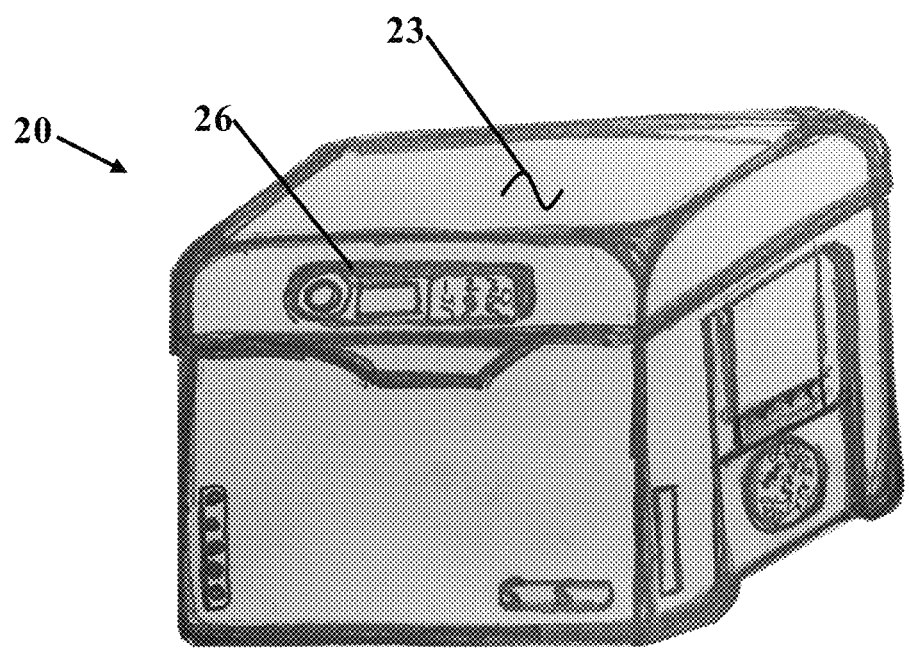
FIG. 3 shows a third embodiment of the electronically operated lockbox mailbox assembly.

FIG. 3 shows a third embodiment of the electronically operated lockbox mailbox assembly 20. This embodiment illustrates potential iterations of a larger freestanding version of a lockbox/mailbox assembly to highlight various potential aspects of the form, features, functions, modularity, dimensions, materials, colors, controls, etc. of said assembly. The lid 23 hinges from the rear of the housing. The assembly 20 has side openings for heat transfer to the heating/cooling and humidity control venting. The heating and cooling can be performed by thermo-electric devices to enable the assembly 20 to perform either heating or cooling as needed.

Figure 4:
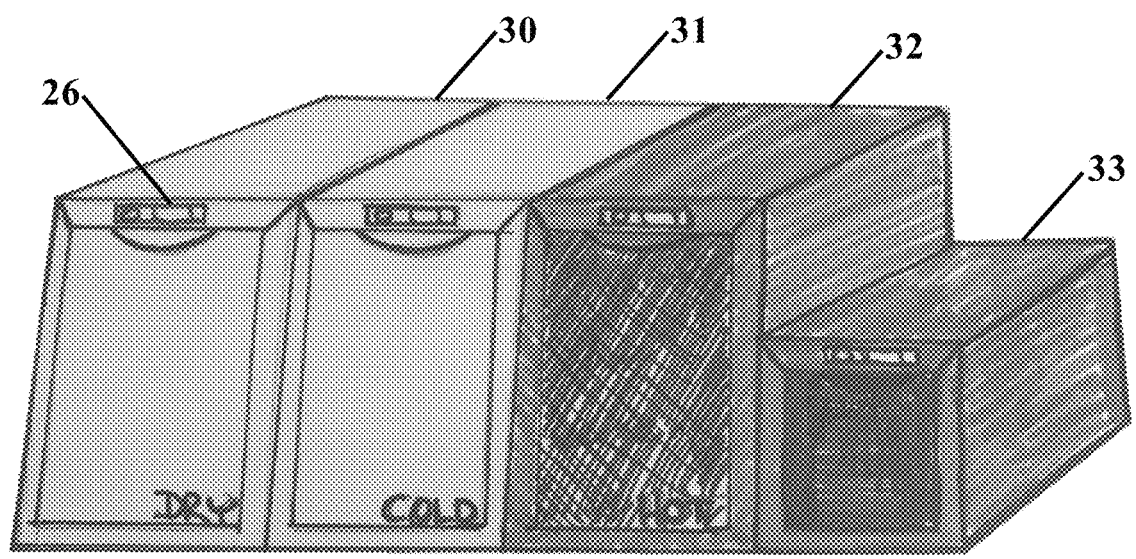
FIG. 4 shows a fourth embodiment of the electronically operated lockbox mailbox assembly.

FIG. 4 shows a fourth embodiment of the electronically operated lockbox mailbox assembly. This embodiment provides multiple joined boxes. This configuration can be used for food delivery where dry products can be placed in a first portion 30, cold items can be placed in a second portion 31, hot items can be placed in a third portion 32 and there is an ambient fourth portion 33.

In the different embodiments the electronically operated lockbox mailbox assembly can be used as a secure shipping box replacement. More simply, a commercial user (FedEx, UPS, Amazon, Plated, etc.) would actually ship LockPods instead of their cardboard boxes. They would lease these from the delivery service or a company as a one-time use. For some applications, the cooling function would replace Styrofoam, dry ice, etc. These could take the form of a box, tube, etc. for different sizes of delivery and be completely, reusable, trackable, etc. After the person has identified themselves through a phone application, unlocked and removed the contents the LockPod can be returned with the next day mail pick-up.

Figure 5:
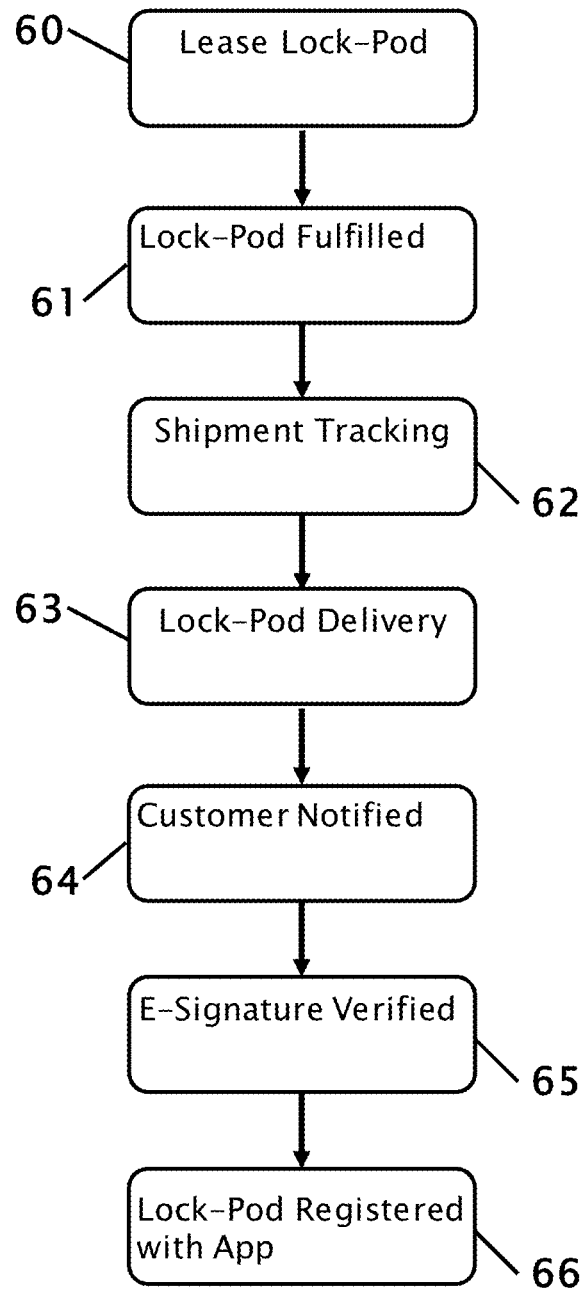
FIG. 5 shows a flow chart for delivery and set-up of the lock-pod.

FIG. 5 shows a flow chart for delivery and set-up of the lock-pod. When an order to lease a Lock-Pod 60 is received shipping facility will scan Lock-Pod code and assign to order number/account registrant. Warehouse/Facility shipper will activate the Lock-Pod with the product fulfillment 61, which will send encrypted ship to information to Lock-Pod tracking service. When the lid closes all of the settings will initialize including temperature control, and shipment tracking 62 from host facility. The delivery 63 scan of Lock-Pod will identify and match ship to address for order and account registered address for verification. Via the Lock-Pod app, the customer is notified 64 and will enter their private pin to e-sign receipt of delivery. (E-Signature Setup in App on Install). Once the order information, account information, e-signature is authenticated verified 65. User will be able to open the Lock-Pod from app. The user will need to link the Lock-Pod to a WiFi network or can use a connection with a cellular network depending upon the type of Lock-Pod.

Figure 6:
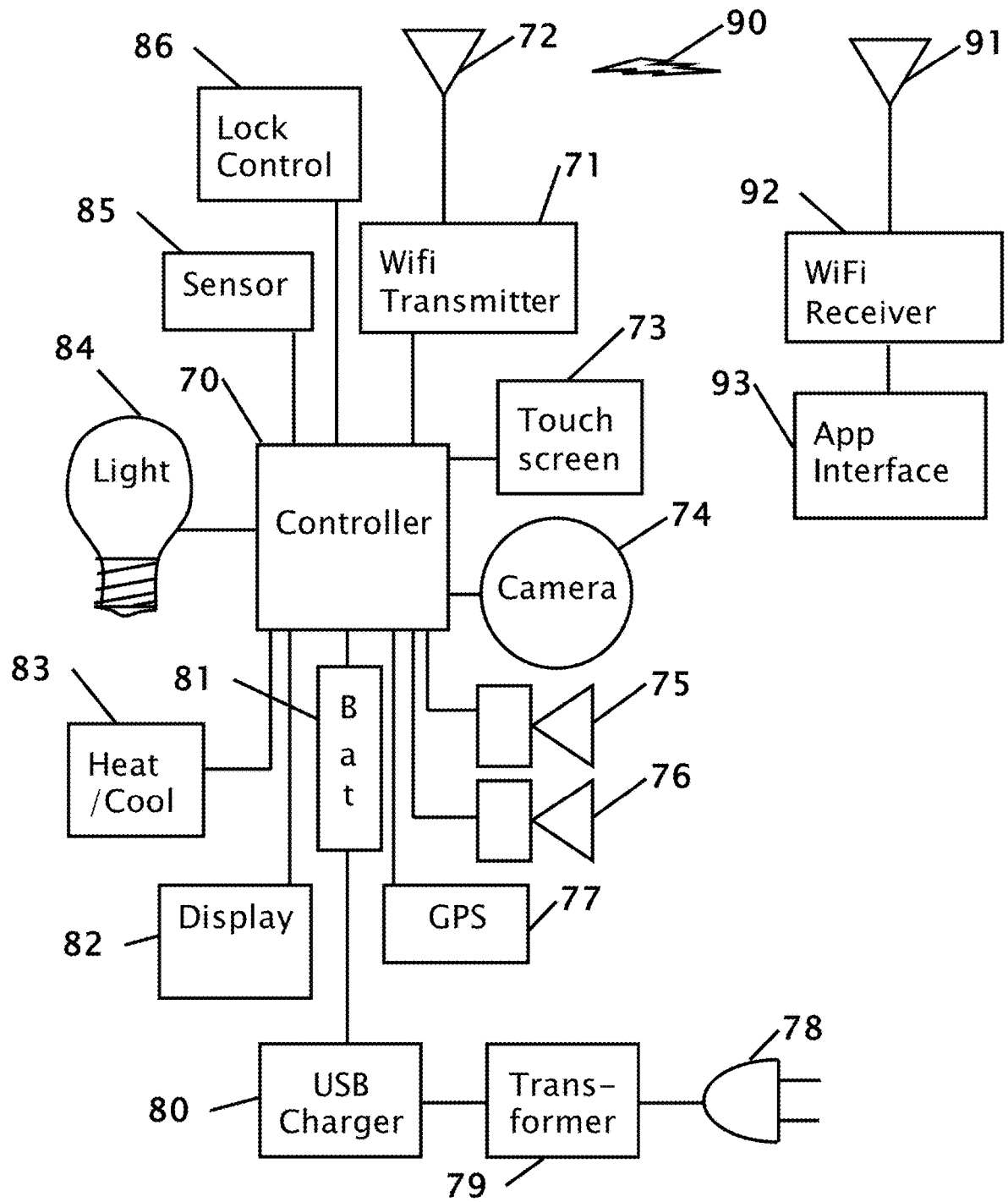
FIG. 6 shows a block diagram of the electronically operated lockbox mailbox assembly.

FIG. 6 shows a block diagram of the electronically operated lockbox mailbox assembly. Each assembly has a central controller 70 that monitors and controls the various functions. The controller 70 is connected to a WiFi transmitter 71 and/or a cellular transmitter, and/or Bluetooth that is connected to an antenna 72 that transmits and receives instructions from a wireless signal 90. While a wireless signal is indicated it can be a wired connection. The signal 90 is received into an antenna 91 with a WiFi receiver at or near the house building or other facility. The controller can also communicate with RFID devices. The receiver communicated to the internet through a user application 93 to a cell phone, tablet or PC. The controller 70 can also communicate directly to a cellphone using the application over Bluetooth or similar communication without requiring communication over the internet.

The controller 70 communicated to a keypad or touch screen 73. The touchscreen 73 can be located on a display 82 and the touchscreen may be used for signing or an E-signature or fingerprint recognition. A camera 74, speaker 75 and microphone 76 allows for recording information on the delivery, scanning labels, barcodes, retina scan and motion detection. A GPS 77 device can determine the location of the assembly. The controller 70 is powered by batteries 81 that are charged or powered by plug 78 through a transformer 79 through a USB charger 80. The controller 70 operated the heating, cooling 83 and humidity control. The controller 70 can also control lights 84 and other sensors 85 as well as lock control 86 to provide or block access to the Lock-Pod.

Figure 7:
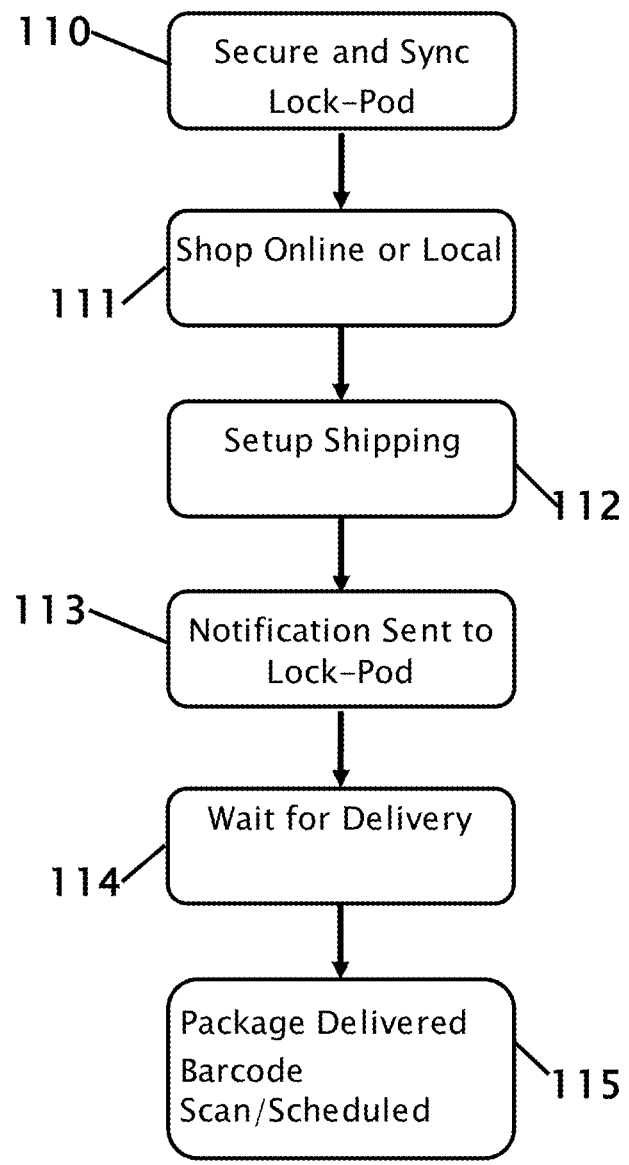
FIG. 7 shows a flow chart of a package deliver to the Lock-Pod.

FIG. 7 shows a flow chart of a package deliver to the Lock-Pod. After delivery of the assembly the Lock=Pod is secured and synced with the Lock-Pod 110. This can involve mounting the wall mount, securing the Lock-Pod and establishing/verifying the connection to the user cell phone, WiFi network or other wired, wireless and power connections.

The user can then shop online or local 111 to purchase items. With the purchase and delivery instruction the user can setup shipping 112 to the Lock-Pod. This also provides a notification that is sent to Lock-Pod 113. The Lock-Pod can track delivery and can pre-heat or pre-cool the Lock-Pod prior to delivery or upon delivery as the Lock-Pod waits for delivery 114. The pre-heat or pre-cool can use historical information about the time to reach the desired temperature along with the expected delivery time to determine when to begin the pre-heat or pre-cool. Once the package is delivered, the Lock=Pod can barcode scan/schedule 115 that the package has been delivered and installed in the Lock-Pod. A notification is made to the application and sent to the user. The user can then use the application to authenticate/unlock the Lock-Pod.

The exemplary embodiments described herein detail for illustrative purposes are subject to many variations of structure and design. It should be emphasized, however that the present invention is not limited to particular lockbox/mailbox assembly as shown and described. Rather, the principles of the present invention can be used with a variety of configurations and arrangements of lockbox/mailbox assemblies. It is understood that various omissions, substitutions of equivalents are contemplated as circumstances may suggest or render expedient, but the present invention is intended to cover the application or implementation without departing from the spirit or scope of the claims.

As used in this application, the words "a," "an," and "one" are defined to include one or more of the referenced items unless specifically stated otherwise. Also, the terms "have," "include," "contain," and similar terms are defined to mean "comprising" unless specifically stated otherwise. The terms 'lockbox or' 'mailbox' or 'lockbox/mailbox assembly' or 'assembly' or 'box' or 'locker' or 'pod' may have been used above interchangeably and refer to convey the same meaning. Furthermore, the terminology used in the specification provided above is hereby defined to include similar and/or equivalent terms, and/or alternative embodiments that would be considered obvious to one skilled in the art given the teachings of the present patent application.

Thus, specific embodiments of an electronically operated lockbox mailbox assembly have been disclosed. It should be apparent, however, to those skilled in the art that many more modifications besides those described are possible without departing from the inventive concepts herein. The inventive subject matter, therefore, is not to be restricted except in the spirit of the appended claims.

SEQUENCE LISTING

Not Applicable.

The invention claimed is:

1. An electronically operated lockbox mailbox assembly comprising:
    a lockbox mailbox assembly that is leased for a future delivery of a leased said lockbox mailbox assembly;
    a wall mount that is permanently secured to a structure;
    said leased lockbox mailbox assembly is configured to lock onto said wall mount;
    delivery of said leased lockbox mailbox assembly and securing said leased lockbox mailbox assembly onto said wall mount;
    said leased lockbox mailbox assembly is electronically operated;
    said electronic operation is with a wireless communication with a user application, and
    said user application includes a user authentication to allow access to an inside of said leased lockbox mailbox;
    wherein said user application tracks delivery of said leased lockbox mailbox assembly and a package that will be placed in said leased lockbox mailbox assembly at a future time;
    removal and return of said leased lockbox mailbox assembly from said wall mount after a user access to said inside of said leased lockbox mailbox.

2. The electronically operated lockbox mailbox assembly according to claim 1, further includes a camera.

3. The electronically operated lockbox mailbox assembly according to claim 2, wherein said camera performs a retina scan.

4. The electronically operated lockbox mailbox assembly according to claim 2, wherein said camera reads barcodes.

5. The electronically operated lockbox mailbox assembly according to claim 2, further includes a speaker and microphone.

6. The electronically operated lockbox mailbox assembly according to claim 1, further includes a GPS locator.

7. The electronically operated lockbox mailbox assembly according to claim 1, further includes a thermal heating device.

8. The electronically operated lockbox mailbox assembly according to claim 1, further includes a cooling device.

9. The electronically operated lockbox mailbox assembly according to claim 1, wherein said leased lockbox mailbox preheats or precools said lockbox mailbox prior to delivery of said package.

10. The electronically operated lockbox mailbox assembly according to claim 9, wherein said leased lockbox mailbox uses tracking information for said delivery to determine when to begin said preheat or precool.

11. The electronically operated lockbox mailbox assembly according to claim 1, wherein said application works with a cellular device over a Bluetooth communication between said leased lockbox mailbox and said cellular device to unlock said leased lockbox mailbox.

12. The electronically operated lockbox mailbox assembly according to claim 1, further includes an internal power supply.

13. The electronically operated lockbox mailbox assembly according to claim 1, further includes an RFID reader.

14. The electronically operated lockbox mailbox assembly according to claim 1, further includes a display.

15. The electronically operated lockbox mailbox assembly according to claim 1, further includes WiFi communication to a network.

16. The electronically operated lockbox mailbox assembly according to claim 1, further includes humidity control within said leased lockbox mailbox.

17. The electronically operated lockbox mailbox assembly according to claim 1, further includes a keypad.

18. The electronically operated lockbox mailbox assembly according to claim 1, wherein said electronic operation links with home automation products.

19. The electronically operated lockbox mailbox assembly according to claim 1, wherein said electronic operation controls a locking mechanism of said leased lockbox mailbox.

\* \* \* \* \*